United States Patent [19]

Chang

[11] E Re. 28,789

[45] Reissued Apr. 27, 1976

[54] PHOTOPOLYMERIZABLE COMPOSITIONS CONTAINING CYCLIC CIS-α-DICARBONYL COMPOUNDS AND SELECTED SENSITIZERS

[75] Inventor: Catherine Teh-Lin Chang, Wilmington, Del.

[73] Assignee: E. I. Du Pont de Nemours and Company, Wilmington, Del.

[22] Filed: Aug. 28, 1975

[21] Appl. No.: 608,673

Related U.S. Patent Documents

Reissue of:

[64] Patent No.: 3,756,827
Issued: Sept. 4, 1973
Appl. No.: 220,694
Filed: Jan. 25, 1972

[52] U.S. Cl. ..... 96/86 P; 96/87 R; 96/115 P; 204/159.23

[51] Int. Cl.[2] ..... G03C 1/94; G03C 1/68; C08F 2/46

[58] Field of Search ..... 96/115 P, 86 P, 87; 204/159.23

[56] References Cited

UNITED STATES PATENTS

| | | | |
|---|---|---|---|
| 2,951,758 | 9/1960 | Notley | 96/115 P |
| 3,427,161 | 2/1969 | Laridon et al. | 96/115 R |
| 3,488,269 | 1/1970 | Allen et al. | 96/115 P |
| 3,661,588 | 5/1972 | Chang | 96/115 P |

*Primary Examiner*—Jack P. Brammer

[57] ABSTRACT

Photopolymerizable compositions comprising an ethylenically unsaturated monomer and an initiating combination of a cyclic cis-α-dicarbonyl compound and certain radiation-absorbing sensitizers are disclosed. Compositions of the invention have improved photospeed and may be chosen to provide a wide range of spectral sensitivity.

12 Claims, No Drawings

PHOTOPOLYMERIZABLE COMPOSITIONS CONTAINING CYCLIC CIS-α-DICARBONYL COMPOUNDS AND SELECTED SENSITIZERS

Matter enclosed in heavy brackets [ ] appears in the original patent but forms no part of this reissue specification; matter printed in italics indicates the additions made by reissue.

BACKGROUND OF THE INVENTION

This invention relates to novel photopolymerizable compositions having high photospeed. Still more particularly, it relates to compositions having novel combinations of chemical compounds as initiators for photopolymerization.

It is known to add certain light absorbing compounds to photopolymerizable compositions containing ethylenically unsaturated monomers for the purpose of increasing the photographic sensitivity of the compositions. The use of α-dicarbonyl compounds and combinations of α-dicarbonyl compounds with ultraviolet radiation-absorbing ketones for photoinsolubilization of photocrosslinkable polymers has been disclosed, e.g., in Laridon, et al., U.S. Pat. No. 3,427,161. However, cyclic cis-α-dicarbonyl compounds are not generally known as photoinitiators in the prior art and have been shown to initiate photopolymerization very poorly (viz., Notley, U.S. Pat. No. 2,951,758, Col. 5, line 39). Surprisingly, it has been found that certain radiation absorbing compounds can transfer energy to the cis-α-dicarbonyl compounds and act as sensitizers therefor. Photopolymerizable compositions containing the novel cis-α-dicarbonyl-sensitizer combinations of this invention have been demonstrated to have greatly improved photospeed and may be chosen to provide a wide range of spectral sensitivity.

SUMMARY OF THE INVENTION

The invention relates to photopolymerizable compositions comprising:

(a) At least one non-gaseous ethylenically unsaturated compound having a boiling point above 100° C. at normal atmospheric pressure and being capable of forming a high polymer by photoinitiated, addition polymerization;

(b) A cyclic cis-α-dicarbonyl compound, the excited state of which cannot react intramolecularly, *the atoms adjacent to the two vicinal carbonyl groups being saturated when they are carbon atoms;*

(c) An actinic radiation absorbing compound capable of sensitizing the polymerization initiating action of said cyclic cis-α-dicarbonyl compound, said actinic radiation absorbing compound being a nitrogen-containing aromatic or heterocyclic compound, having maximum absorption below 520 nm., selected from the class consisting of bis (p-aminophenyl-α,β-unsaturated)ketones; bis(alkylamino) acridine dyes; cyanine dyes containing two heterocyclic rings joined by a single methine group; styryl dye bases; 7-diloweralkylamino-4-lower alkyl coumarins; p-aminophenyl ketones; p-dialkylaminophenyl unsaturated compounds; and 6-dialkylaminoquinaldines;

(d) Optionally, a free-radical producing hydrogen or electron donor compound; and (e) Optionally, a macromolecular organic polymer binder.

Constituents (b), (c) and (d) are employed in the respective amounts of 0.001–10, 0.001–10, and 0–10 parts by weight per 100 parts by weight of constituents (a) and (e). Constituents (a) and (e) are present in relative amounts from 3–100 and 0–97 parts by weight, respectively.

Compositions of the invention have improved photoinitiation and photographic speed when used in imaging elements. Such elements may be self-supporting or comprise a support coated with the above-described composition. As shown in the examples, imaging elements using the compositions of the invention displayed photographic speeds of at least about 2.5 times the speed of an element containing a cis-α-dicarbonyl compound without a radiation absorbing sensitizer.

DESCRIPTION OF THE PREFERRED EMBODIMENTS

The photopolymerizable compositions of this invention preferably comprise the five constituents set forth above. Constituents (a) and (e) are preferably present in relative amounts from 3–95 and 5–97 parts by weight, respectively.

The preferred photopolymerizable compositions may contain, in addition to constituents (a), (b), (c), (d), and (e), an additional constituent, i.e., (f) a thermal addition polymerization inhibitor.

Suitable free-radical initiated, chain-propagating, addition polymerizable, ethylenically unsaturated compounds include preferably an alkylene or a polyalkylene glycol diacrylate prepared from an alkylene glycol of 2 to 15 carbons or a polyalkylene ether glycol of 1 to 10 ether linkages, and those disclosed in Martin and Barney U.S. Pat. No. 2,927,022, issued Mar. 1, 1960, e.g., those having a plurality of addition polymerizable ethylenic linkages, particularly when present as terminal linkages, and especially those wherein at least one and preferably most of such linkages are conjugated with a doubly bonded carbon, including carbon doubly bonded to carbon and to such heteroatoms as nitrogen, oxygen and sulfur. Outstanding are such materials wherein the ethylenically unsaturated groups, especially the vinylidene groups, are conjugated with ester or amide structures. The following specific compounds are further illustrative of this class; unsaturated esters of alcohols, preferably polyols and particularly such of the alphamethylene carboxylic acids, e.g., ethylene glycol diacrylate, diethylene glycol diacrylate, glycerol diacrylate, glycerol triacrylate, ethylene glycol dimethyacrylate, 1,3-propanediol dimethacrylate, 1,2,4-butanetriol trimethacrylate, 1,4-cyclohexanediol diacrylate, 1,4-benzenediol dimethacrylate, pentaerythritol tetramethacrylate, 1,3-propanediol diacrylate, 1,3-pentanediol dimethacrylate, the bis-acrylates and methacrylates of polyethylene glycols of molecular weight 200–500, and the like; unsaturated amides, particularly those of the alphamethylene carboxylic acids, and especially those of alpha-omega-diamines and oxygen-interrupted omega-diamines, such as methylene bis-acrylamide, methylene bis-methacrylamide ethylene bis-methacrylamide, 1,6-hexamethylene bis-acrylamide, diethylene triamine tris-methacrylamide, bis(-gamma-methacrylamidopropoxy) ethane beta-methacrylamidoethyl methacrylate, N-(beta-hydroxyethyl)-beta-(methacrylamido) ethyl acrylate and N,N-bis (beta-methacryloxyethyl) acrylamide; vinyl esters such as divinyl succinate, divinyl adipate, divinyl phthalate, divinyl terephthalate, divinyl benzene-1,3-disulfonate, and divinyl butane-1,4-disulfonate; styrene and derivatives thereof and unsaturated aldehydes, such as sorbaldehyde (hexadienal). An outstanding class of these preferred addition polymerizable components are the esters and amides of alpha-methylene carboxylic acids and substituted carboxylic acids with polyols and polyamines wherein the molecular chain between the hydroxyls and amino groups is solely carbon or oxygen-interrupted carbon. The preferred monomeric compounds are polyfunctional, but monofunctional monomers can also be used. In addition, the polymerizable, ethylenically unsaturated polymers of Burg U.S. Pat. No. 3,043,805, Martin U.S. Pat. No. 2,929,710 and similar materials may be used alone or mixed with other materials. Acrylic and methacrylic esters of polyhydroxy compounds such as pentaerythritol and trimethylolpropane, and acrylic and methacrylic esters of adducts of ethylene oxide and polyhydroxy compounds such as those described in Cohen and Schoenthaler, U.S. Pat. 3,380,831 are also useful. The photocrosslinkable polymers disclosed in Schoenthaler, U.S. Pat. No. 3,418,295, and Celeste, U.S. Pat. No. 3,448,089, may also be used. The amount of monomer added varies with the particular polymer used.

The cyclic cis-$\alpha$-dicarbonyl compounds useful as component (b) of this invention are those organic compounds having vicinal carbonyl groups in which the oxygen atoms of said carbonyl groups are constrained to lie on one side of the molecule; the remaining portion of the cyclic molecule may contain one or more hetero atoms, in addition to carbon atoms. When the atoms adjacent to the two vicinal carbonyl groups are both carbon atoms, they must be saturated. The excited state of the cyclic dicarbonyl compound produced by absorption of radiation or by energy transfer from a sensitizing molecule must not be able to react by intramolecular hydrogen abstraction to form cyclic products. This property is found in those cyclic cis-$\alpha$-dicarbonyl compounds in which the carbonyl groups are held rigidly in a conformation which prevents such cyclization reactions. The required rigid molecular conformation is conveniently obtained by using cyclic cis-$\alpha$-dicarbonyl compounds in which the carbonyl groups are incorporated in a multiple-ring structure. A preferred such compound is 2,3-bornanedione (also known as camphor-quinone). Others operable are the following:

2,2,5,5-tetramethyl-tetrahydro-3,4-furandione;
Parabanic acid (imidazoletrione);
indole-2,3-dione (Isatin);
1,1,4,4-tetramethyl-tetralin-2,3-dione;
3-methyl-1,2-cyclopentanedione;
2,3-dioxo-5,6-diethoxy-5,6-dicyanopyrazine;
1,4,5,6-tetrahydro-5,6-dioxo-2,3-pyrazine dicarboxamide.

The actinic radiation absorbing compounds useful as component (c) of the composition of this invention which are capable of being raised to an excited state by absorption of actinic radiation and which have been found to sensitize the cyclic cis-$\alpha$-dicarbonyl compound when so excited are nitrogen-containing aromatic or heterocyclic compounds having maximum absorption below 520 nm., selected from the class consisting of bis(p-aminophenyl-$\alpha,\beta$-unsaturated) ketones; bis-(alkylamino) acridine dyes; cyanine dyes containing two heterocyclic rings joined by a single methine group; styryl dye bases; 7-diloweralkylamino-4-lower alkyl coumarins; p-aminophenyl ketones; p-dialkylaminophenyl unsaturated compounds; and 6-dialkylaminoquinaldines, all as defined below.

For the purposes of this invention, the above-listed radiation absorbing compounds are defined as follows: The bis(p-aminophenyl-$\alpha,\beta$-unsaturated) ketones are those of claim 1 of application Ser. No. 53,686 of Baum and Henry, allowed Sept. 7, 1971, *now U.S. Pat. No. 3,652,275* and which are also described on page 3, line 25 to page 4, line 7 and page 6, line 11 to page 8, line 19 of that application. The bis(alkylamino) acridine dyes are those defined by the formula on Column 9, lines 31–42, of U.S. Pat. No. 3,563,751 to Cohen, issued Feb. 16, 1971, and which are further described on Column 3, lines 21–43 and lines 50–71 of that patent. The cyanine dyes are the simple cyanines having two heterocyclic nuclei joined by a single methine group defined by the formula below:

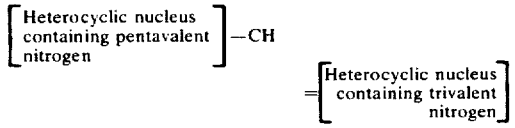

Some examples of such cyanine dyes are given on Column 3, lines 17–33, of U.S. Pat. No. 3,099,558 to Levinos, issued July 30, 1963. The styryl dye bases have a heterocyclic nucleus and a benzene nucleus joined by a vinyl group and are defined by the following formula:

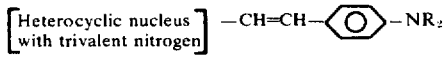

where $R_2$ is $C_1$–$C_4$ alkyl. Some compounds of this type are contained in the list on Column 6, line 61 to Column 7, line 9 of the Levinos patent. A preferred styryl dye base is 2-(p-dimethylaminostyryl) benzothiazole.

The 7-diloweralkylamino - 4 - lower alkyl coumarins are coumarins, with $C_1$–$C_4$ alkyl substituents in the 4 and 7 positions. Several examples of such coumarins are given on Column 3, line 71 to Column 4, line 4, of U.S. Pat. No. 3,583,797, to James et al., issued Oct. 15, 1970. The p-aminophenyl ketones are those defined by the formula on Column 15, line 71 to Column 16, line 4, of U.S. Pat. No. 3,552,973, to Fishman, issued Jan. 5, 1971. Further description of these ketones is provided on Column 3, line 40 to Column 4, line 10, of that patent. p,p'-Bis(dimethylamino) benzophenone, known as Michler's ketone, is included in this class.

The p-dialkylaminophenyl unsaturated compounds are defined by the formula:

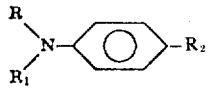

where R and $R_1$ are alkyl groups of 1–4 carbons, and $R_2$ may be —CN, —CHO,

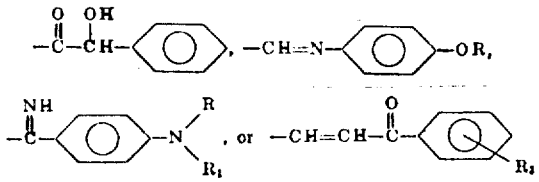

wherein $R_3$ may be hydrogen,

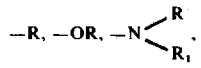

halogen, or phenyl.

The 6-dialkylaminoquinaldines are defined by the formula

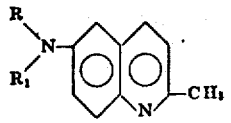

where R and $R_1$ are alkyl groups of 1–4 carbon atoms.

Of the above actinic radiation absorbing compounds the most preferred are Michler's ketone and its homologues, vinylogs, and analogs, cyanine dyes and styryl dye bases, and their mixtures.

The free-radical producing hydrogen donor compounds useful as component (d) are alkyl and alkoxy alcohols, ethers, aldehydes, ketones, carboxylic acids, esters, amines, and amides, i.e., compounds containing an abstractable hydrogen atom. Suitable active methylene compounds include 5,5-dimethyl-1,3-cyclohexanedione, 1,3-indanedione, 2-phenyl 1,3-indanedione, 1,3-diphenyl-1,3-propanedione, and 4,4,4-trifluoro-2,4-hexanedione. Suitable amines include the monoalkyl, dialkyl and trialkylamines, where alkyl has 1–6 carbon atoms, e.g., triethylamine, dibutylamine and trihexylamine; alkylenediamines of 1–4 carbon atoms, e.g. ethylenediamine and 1,3-propylenediamine; alkanolamines, e.g., ethanolamine, diethanolamine, and triethanolamine; and the polyamines disclosed in Chambers U.S. Pat. No. 3,026,203, issued Mar. 20, 1962. Other suitable amines are disclosed in Chambers U.S. Pat. No. 3,479,185, issued Nov. 18, 1969. Mixtures of two or more of constituents (d) are useful.

Triphenylphosphine, and electron donor, is also useful as component (d).

Macromolecular film forming organic polymers suitable for component (e) are:

(A) Polyesters, e.g. poly-ε-caprolacetone, and copolyesters, e.g., those prepared from the reaction product of a polymethylene glycol of the formula $HO(CH_2)_nOH$, wherein n is a whole number 2 to 10 inclusive, and (1) hexahydroterephthalic, sebacic and terephthalic acids, (2) terephthalic, isophthalic and sebacic acids, (3) terephthalic and sebacic acids, (4) terephthalic and isophthalic acids, and (5) mixtures of copolyesters prepared from said glycols and (i) terephthalic, isophthalic and sebacic acids and (ii) terephthalic, isophthalic, sebacic and adipic acids.

(B) Nylons or polyamides, e.g., N-methoxymethyl polyhexamethylene adipamide;

(C) Vinylidene chloride copolymers, e.g., vinylidene chloride/acrylonitrile; vinylidene chloride/methacrylate and vinylidene chloride/vinylacetate copolymers;

(D) Ethylene/vinyl acetate copolymers;

(E) Cellulosic ethers, e.g., methyl cellulose, ethyl cellulose and benzyl cellulose;

(F) Polyethylene;

(G) Synthetic rubbers, e.g., butadiene/acrylonitrile copolymers, and 2-chloro-1,3-butadiene polymers;

(H) Cellulose esters, e.g., cellulose acetate, cellulose acetate succinate and cellulose acetate butyrate;

(I) Polyvinyl esters, e.g., poly(vinyl acetate/acrylate), poly(vinyl acetate/methacrylate) and poly(vinyl acetate);

(J) Polyacrylate and alpha-alkyl polyacrylate esters, e.g., poly(methyl methacrylate) and poly(ethyl methacrylate);

(K) Polyethers, i.e., the polyethylene oxides of polyglycols;

(L) Poly(vinyl chloride) and copolymers, e.g., poly(vinyl chloride/acetate);

(M) Poly(vinyl acetal), e.g., polyvinyl butyral), poly(vinyl formal);

(N) Polyformaldehydes;

(O) Polyurethanes;

(P) Polycarbonates;

(Q) Polystyrenes.

To the polymer constituent of the photo-polymerizable composition there can be added non-thermoplastic or other polymeric compounds to improve certain desirable characteristics, e.g., adhesion to the base support, adhesion to the image-receptive support on transfer, wear properties, chemical inertness, etc. Suitable polymeric compounds for addition include polyvinyl alcohol, cellulose, anhydrous gelatin, phenolic resins and melamineformaldehyde resins, etc. If desired, the photopolymerizable layers can also contain immiscible polymeric or nonpolymeric organic or inorganic fillers or reinforcing agnets which are essentially transparent at the wavelengths used for the exposure of the photopolymeric material, e.g., the organophilic silicas, bentonites, silica, powdered glass, colloidal carbon, as well as various types of dyes and pigments. Such materials are used in amounts varying with the desired properties of the photopolymerizable layer. The fillers are useful in improving the strength of the compositions, reducing tack and in addition, as coloring agents. The photopolymerizable compositions of the invention may also be dispersed in a hydrophilic colloid such as gelatin as shown in Example LX.

The photopolymerizable compositions may also contain thermal polymerization inhibitors, e.g., p-methoxyphenol, hydroquinone, and alkyl and aryl-substituted hydroquinones and quinones, tert-butyl catechol, pyrogallol, copper resinate, naphthylamines, beta-naphthol, cuprous chloride, 2,6-di-tert-butyl-p-cresol, phenothiazine, pyridine, nitrobenzene and dinitrobenzene, p-toluquinone and chloranil. They are present in 0.001% to 4% by weight of the compositions.

Since free-radical generating addition-polymerization initiators activatable by actinic radiation generally exhibit their maximum sensitivity in the ultraviolet range, the radiation source should usually furnish an effective amount of this radiation. Such sources include carbon arcs, mercury vapor arcs, fluorescent lamps with ultraviolet radiation emitting phosphors, argon glow lamps, electronic flash units and photographic flood lamps. Of these, the mercury-vapor arcs are customarily used at a distance of one and one-half to 20 inches from the photopolymerizable layer. It is noted, however, that in certain circumstances it may be advantageous to expose to visible light. In such cases, the radiation source should furnish an effective amount of fisible radiation. Many of the radiation sources listed above furnish the required amount of visible light.

The photopolymerizable compositions and elements of this invention may be coated on metal surfaces to make presensitized lithographic printing plates, or to serve as photoresists in making etched or plated circuits or in chemical milling applications. They are also useful for preparing colored images suitable for color proofing from color separation negatives. The images formed with these elements may also be used for making copies by thermal transfer to a substrate. Specific uses will be evident to those skilled in the art; many uses are disclosed in U.S. Pat. Nos. 2,760,863; 3,060,023; and 3,060,026.

Suitable support, including metal and flexible polymer film supports for the photopolymerizable layers as well as processes for coating the supports, are described in the patents listed in the preceding paragraph.

The practice of the invention will be illustrated by the examples which follow.

EXAMPLES I–XLVIII

Several portions of coating solutions were prepared as follows:

| | G. |
|---|---|
| Cellulose acetate (acetyl 40.0%, ASTM visc. 25) | 2.7 |
| Cellulose acetate butyrate (butyrate 17%, ASTM visc. 15) | 4.2 |
| Trimethylolpropane triacrylate | 13.5 |
| Acetone | 116.0 |

Quantities of cis-α-dicarbonyl compounds and coinitiators were added to the solution to provide the concentration of initiators and coinitiators in the coated sample shown in Table I. The solutions were coated on 0.001-inch-thick polyethylene terephthalate supports to a wet thickness of 0.002 inch, dried to form a photopolymerizable layer and laminated at room temperature with 0.001-inch-thick polyethylene terephthalate cover sheets.

Samples were exposed through an Eastman Kodak M-type step tablet No. 5 composed of carbon particles dispersed in gelatin and sealed in cellulose acetate, having a density gradation of $3\sqrt{2}$ optical density units per step. Exposures were made with a 1000 watt tungsten-filament bulb (General Electric DXW) operated at 120 volts to give a color temperature of 3200° K., at a distance of 44 inches from the sample. After exposure, the cover sheet was removed, and the photopolymerizable layer was dusted with Jungle Black (Pigment Black I, C.I. 50440) to give a positive image. The optical densities of the steps of the image were measured and plotted against log exposure. The log exposure which gave an optical density of 0.1 above the optical density of base plus fog was chosen as characteristic of the sensitivity of the layer. The relative speeds of several compositions are given in Table I, expressed as equivalent exposure time, the actual exposure time in seconds required to form an image of optical density 0.1 above base plus fog multiplied by the percent transmission of the step wedge at that point. Note that a lower number means a photographically faster system. The molar concentrations of the ingredients in the coated and dried compositions are given in parentheses after each ingredient. The wavelength of maximum absorption, $\lambda_{max}$, is given in nanometers. Two or three values for $\lambda_{max}$, indicates an absorption doublet or triplet, the highest value being required to be less than 520 nm.

TABLE I

| Example | Cis-α-dicarbonyl compound | | Sensitizers | |
|---|---|---|---|---|
| I | 2,3-bornanedione | 0.047 | Michler's ketone | 0.047 |
| II | do | 0.047 | 4,4'-bis(diethylamino)-benzophenone | 0.047 |
| III | do | 0.047 | 4-dimethylaminobenzophenone | 0.047 |
| IV | do | 0.047 | 4-dimethylaminoacetophenone | 0.047 |
| V | do | 0.047 | 4-dimethylaminobenzoin | 0.047 |
| VI | do | 0.047 | 4-dimethylaminobenzaldehyde | 0.047 |
| VII | do | 0.047 | 4-dimethylaminobenzonitrile | 0.047 |
| VIII | do | 0.047 | 7-diethylamine-1-methylconmarin | 0.047 |
| IX | do | 0.094 | 3,3'-diethylthiacyanine-p-toleunesulfonate | 0.023 |
| X | do | 0.094 | do | 0.023 |
| | | | Michler's ketone | 0.047 |
| XI | do | 0.094 | 3,3'-diethylthiacyaninic p-toluenesulfonate | 0.023 |
| | | | 7-diethylamino-4-methylcoumarin | 0.047 |
| XII | do | 0.047 | 2-p-dimethylaminostyryl)-benzothiazole | 0.047 |
| XIII | do | 0.047 | 2-(p-dimethylaminostyryl)benzothiazole | 0.047 |
| | | | Michler's ketone | 0.047 |
| XIV | do | 0.047 | [3-ethyl-naphthoxazole]13'-ethyl-naphthothiazole]monomethinecyanine p-toluenesulfonate. | 0.024 |
| | | | Michler's ketone | 0.047 |
| XV | do | 0.094 | 3,3'-diethylthiacyanine-p-toluenesulfonate | 0.023 |
| | | | Triethanolamineg | 0.2 |
| XVI | do | 0.091 | 3,3'-diethylthiacyanine p-toluenesulfonate | 0.023 |
| | | | 5,5-dipethyl-1,3-cyclohexanedione | 0.094 |
| XVII | do | 0.094 | 3,3'diethylthiacyanine p-toluenesulfonate | 0.023 |
| | | | N-phenylglycine | 0.094 |
| XVIII | do | 0.094 | 3,3'diethylthiacyanine p-toluenesulfonate | 0.023 |
| | | | 4-dimethylaminobenzophenone | 0.047 |
| XIX | do | 0.094 | 2,5-bis(p-diethylaminobenzilidene) cyclopentanone. | 0.047 |
| XX | 2,2,5,5-tetramethyltetrahydro-3,4-furandione. | 0.094 | do | 0.023 |
| XXI | do | 0.094 | Micher's ketone | 0.047 |
| XXII | do | 0.094 | Micher's ketone | 0.047 |
| | | | 2,5-bis(p-diethylaminobenzilidene) cyclpentanone | 0.023 |
| XXIII | do | 0.094 | 3,3'-diethylthiacyanine-p-toluenesulfonate | 0.023 |
| XXIV | do | 0.094 | 3,3'-diethylthiacyanine-p-toluenesulfonate | 0.023 |
| | | | Michler's ketone | 0.047 |
| XXV | Parabanic acid (imidazoletrione) | 0.094 | Michler's ketone | 0.047 |
| XXVI | 2,3-bornanedione | 0.047 | Michler's ketone | 0.047 |
| | | | Triphenylphosphine | 0.047 |
| XXVII | do | 0.094 | 3,3'-diethylthiacyanine-p-toluenesulfonate | 0.023 |
| | | | Michler's ketone | 0.047 |
| | | | Triphenylphosphine | 0.947 |

TABLE I-continued

| Example | Cis-α-dicarbonyl compound | | Sensitizers | |
|---|---|---|---|---|
| XXVIII | 1,4,5,6-tetrahydro-5,6-dioxo-2,3-pyrazine-dicarboximide. | 0.047 | Michler's ketone | 0.047 |
| XXIX | 2,3-dioxo-5,6-diethoxy-5,6-dicyanopyrazine- | 0.047 | do | 0.047 |
| XXX | 1,1,4,4-tetramethyltetralin-2,3-dione | 0.007 | do | 0.047 |
| XXXI | Indole-2,3-dione | 0.047 | do | 0.047 |
| XXXII | 3-methyl-1,2-cyclopentanedione | 0.094 | do | 0.047 |
| XXXIII | 2,3-bornanedione | 0.188 | 1,3-bis(p-dimethylaminobenzylidene)acetone | 0.023 |
| XXXIV | do | 0.094 | Auramine-O-[bis(p-dimethylaminophenyl)-methyleneamine]. | 0.024 |
| XXXV | do | 0.047 | N-(p-dimethylaminobenzylidene)-p-anisidene | 0.047 |
| XXXVI | do | 0.094 | Acridine orange | 0.023 |
| XXXVII | do | 0.094 | 6-dimethylaminoquinaldine | 0.047 |
| XXXVIII | do | 0.094 | | |
| XXXIX | do | 0.24 | | |
| XL | 2,2,5,5-tetramethyltetrahydro-3,4-furandione. | 0.24 | | |
| XLI | do | 0.188 | 1,3-bis(p-dimethylaminobenzylidene)acetone | 0.023 |
| XLII | do | 0.094 | 2,5-bis(p-dimethylaminocinnamylidene) cyclopentanone. | 0.047 |
| XLIII | 2,3-bornanedione | 0.094 | ω-p-dimethylaminobenzylidene-4-methylacetophenone. | 0.047 |
| XLIV | 2,2,5,5-tetramethyltetrahydro-3,4-furandione. | 0.094 | do | 0.047 |
| XLV | 2,3-bornanedione | 0.094 | Diethyl orange | 0.023 |
| XLVI | do | 0.094 | Diethyl orange<br>N-phenylglycine | 0.023<br>0.094 |
| XLVII | | | Diethyl orange<br>N-phenylglycine | 0.023<br>0.094 |
| XLVIII | 2,2,5,5-tetramethyltetrahydro-3,4-furandione. | 0.094 | Diethyl orange | 0.023 |

| Example | λmax. | Equivalent exposure time |
|---|---|---|
| I | 358 | 2.9 |
| II | 370 | 1.9 |
| III | 350 | 18.0 |
| IV | 325 | 24.0 |
| V | 343 | 11.6 |
| VI | 3.23 | 14.4 |
| VII | 312 | 36.0 |
| VIII | 370 | 7.2 |
| IX | 410,430 | 36.0 |
| X | 410,430 | 1.8 |
| | 358 | |
| XI | 410,430 | 3.2 |
| | 370 | |
| XII | 412,428 | 18.0 |
| | 412,428 | 1 |
| XIII | 358 | |
| | 398,425 | 1.6 |
| XIV | 358 | |
| XV | 410,430 | 9.5 |
| XVI | 410,430 | 9.5 |
| XVII | 410,430 | 2.3 |
| XVIII | 410,430 | 2.9 |
| XIX | 475 | 90.0 |
| XX | 475 | 12.0 |
| XXI | 358 | 5.8 |
| | 358 | 4.7 |
| XXII | 475 | |
| XXIII | 410,430 | 140.0 |
| XXIV | 410,430 | 4.0 |
| XXV | 358 | 16.0 |
| XXVI | 358 | 1.5 |
| | 410,430 | 0.7 |
| XXVII | 358 | |
| XXVIII | 358 | 68 |
| XXIX | 358 | 44 |
| XXX | 358 | 11 |
| XXXI | 358 | 5.7 |
| XXXII | 358 | 15 |
| XXXIII | 435 | 5.7 |
| XXXIV | 375,396,440 | 12 |
| XXXV | 314 | 36 |
| XXXVI | 490 | 150 |
| XXXVII | 380 | 90 |
| XXXVIII | | ~400 |
| XXXIX | | 220 |
| XL | | >400 |
| XLI | 435 | 3.8 |
| XLII | 505 | 115 |
| XLIII | 410 | 9.5 |
| XLIV | 410 | 15 |
| XLV | 470,502 | 45 |
| XLVI | 470,502 | 1.8 |
| XLVII | 470,502 | 5.7 |
| XLVIII | 470,502 | 36 |

All of the components used in the preceding table have been previously described in the literature, except the cis-α-dicarbonyl compounds of Examples XXVIII and XXIX; they are prepared as follows:

(A) 1,4,5,6-tetrahydro-5,6-dioxo-2,3-pyrazinedicarboximide

A solution of 2,3-dioxo-5,6-dicyano-1,2,3,4-tetrahydropyrazine (14.57 g., 0.09 mole, prepared as described by H. Bredereck and G. Schmotzer, Ann., 600, 95–108 (1956)) in concentrated sulfuric acid (150 ml.) was stirred at room temperature for one week, then poured onto ice (650 g.). The precipitate was washed twice with water (500 ml.) and then with acetone (500 ml.). The product obtained (12.9 g., 79% yield, M.P. 408° C., dec.) was analytically pure and yielded the following analysis:

IR: 3175 cm.$^{-1}$ (NH); 1780, 1730 cm.$^{-1}$ (imide C=O); 1700, 1680 cm.$^{-1}$ (C=O); 1600 cm.$^{-1}$ (C=C); 1525 cm.$^{-1}$ (NH).

UV: $\lambda_{max.}^{H_2O}$ 222 mμ (ε 11,370); 301 mμ (ε 9,650); 375 mμ (ε 960).

Analysis.—Calcd. for $C_6H_3O_4N_3$ (percent): C, 39.79; H, 1.67; N, 23.20. Found (percent): C, 39.61, 39.75; H, 1.89, 1.76; N, 22.99, 23.12.

This reaction may be summarized by the following equation:

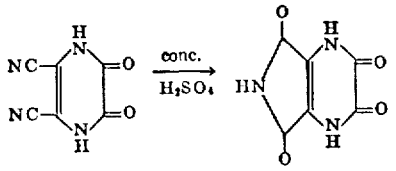

The 1,4,5,6-tetrahydro-5,6-dioxo-2,3-pyrazinedicarboximide prepared by this procedure was then used in Example XXVIII.

(B) 2,3-dioxo-5,6-diethoxy-5,6-dicyanopyrazine

A solution of diiminosuccinonitrile (DISN) (20 g., 0.188 mole, prepared as described by Webster, U.S. Pat. No. 3,564,039, issued Feb. 16, 1971) in acetonitrile (250 ml.) was slowly added (1.75 hr.) at room temperature to oxalyl chloride (60 g., 0.475 mole) in diethyl ether (150 ml.). After further stirring at room temperature (3 hours), the solvents and excess oxalyl chloride were removed (oil pump), followed by dissolution in acetonitrile (100 ml.) and absolute ethanol (100 ml.). This mixture was stirred overnight at room temperature and then filtered. The filtrate was preabsorbed in SilicAR CC7 and chromatographed. Elution with diethyl ether gave crude product as a viscous oil which solidified on standing. Recrystallization from acetonitrile: carbon tetrachloride (1:1) gave pure product (2.04 g., 4.3% yield, M.P. 205–208° C.) as analyzed below for use in Example XXIX.

IR: 3340 to 2860 cm.$^{-1}$ (broad, N—H); 2245 cm.$^{-1}$ (C=N); 1725 cm.$^{-1}$ (C=O); 1103 cm.$^{-1}$ (C—O—C).

HRMS: molecular ion, meas. m/e 252.0849; calcd. m/e for $C_{10}H_{12}O_4$, 252.0859.

Analysis.—Calcd. for $C_{10}H_{12}O_4N_4$ (percent): C, 47.62; H, 4.80; N, 22.22. Found (percent): C, 47.91, 47.82; H, 4.88, 4.82; N, 22.32, 22.31.

The reactions may be summarized by the following equation:

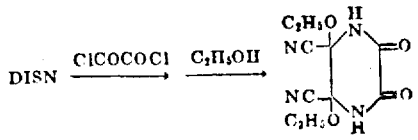

EXAMPLES XLIX–LVII

Several portions of coating solution were prepared having the following composition.

| | G. |
|---|---|
| Poly(methyl methacrylate) | 57.9 |
| Triethyleneglycol dimethacrylate | 33.1 |
| Victoria Pure Blue B.O. (C.I. 42595) | 0.03 |
| Trichloroethylene | 364.0 |

Quantities of cis-α-dicarbonyl compound and coinitiators were added to the solutions to provide the concentrations of initiators and co-initiators in the coated sample shown in Table II. The solutions were coated on a 0.001-inch-thick polyethylene terephthalate web to a wet thickness of 0.003 inch using a doctor knife, allowed to dry at room temperature and laminated onto the copper surface of a copperclad 0.003-inch-thick polyethylene terephthalate web at 120° C. and 40 lb. per square inch pressure. The elements so prepared were exposed through a $\sqrt{2}$ silver step tablet using a 3750 watt pulsed xenon arc at a distance of 18 inches (nuArc Platemaker FT–26–N), for 30 seconds. After exposure, the cover sheet was removed; the image was developed by spraying with 1,1,1-trichloroethane from a distance of 5 inches at a pressure of 5 lb. per square inch for 45 seconds to remove the unpolymerized portions of the layer, followed by water washing. The samples were then etched in 42° Baume ferric chloride solution which removed the copper where it was not protected by the photopolymerized portions of the layer. The minimum exposure required to produce a film that resisted etching was taken as the speed point. The relative photospeed of each sample is recorded in Table II.

TABLE II

| Example | Cis-α-dicarbonyl compound | | Sensitizers | |
|---|---|---|---|---|
| XLIX | 2,3-bornanedione | 0.045 | Michler's ketone | 0.022 |
| L | Parabanic acid | 0.045 | do | 0.022 |
| LI | 2,3-bornanedione | 0.045 | 3,3'-diethylthiacyanine p-toluene-sulfonate | 0.024 |
| | | | Michler's ketone | 0.022 |
| LII | 2,3-bornanedione | 0.045 | 7-diethylamino-4-methylcoumarin | 0.022 |
| LIII | 2,3-bornanedione | 0.045 | 3,3'-diethylthiacyanine p-toluene-sulfonate | 0.024 |

TABLE II-continued

| Example | Cis-α-dicarbonyl compound | | Sensitizers | |
|---|---|---|---|---|
| LIV | 2,3-bornanedione | 0.045 | 3,3'-diethylthiacyanine-p-toluene-sulfonate<br>Triethanolamine | 0.024<br>0.078 |
| LV | 2,3-bornanedione | 0.045 | 3,3'-diethylthiacyanine p-toluene-sulfonate<br>5,5-dimethyl-1,3-cyclohexanedione | 0.024<br>0.055 |
| LVI | 2,3-bornanedione | 0.045 | | |
| LVII | 2,2,5,5-tetramethyltetrahydro-3,4-furandione | 0.090 | 2,5-bis(p-diethylaminobenzilidene)cyclopentanone | 0.023 |
| Control | None | | Michler's ketone | 0.45 |

| Example | λ max: | Relative photospeed |
|---|---|---|
| XLIX | 358 | 2.8 |
| L | 358 | 1.4 |
| LI | 410,430<br>358 | 11.0 |
| LII | 370 | 1.2 |
| LIII | 410,430 | 0.6 |
| LIV | 410,430 | 2.8 |
| LV | 410,430 | 2.0 |
| LVI | | |
| LVII | 475 | 0.36 |
| Control | | 1.0 |

EXAMPLE LVIII

A coating solution was prepared as follows:

| | G. |
|---|---|
| Poly(methyl methacrylate) (M.W. 60,000) | 2.53 |
| Triethyleneglycol dimethacrylate | 2.17 |
| 3,3'-diethylthiacyanine p-toluenesulfonate | 0.08 |
| Michler's ketone | 0.08 |
| 2,3-boronanedione | 0.10 |
| Trichloroethylene | 20.0 |

The solution was coated at a wet thickness of 0.002 inch on a 0.0075-inch-thick polyethylene terephthalate web support and allowed to dry.

A second coating solution was prepared as follows:

| | G. |
|---|---|
| Poly(methyl methacrylate) (M.W. 60,000) | 1.27 |
| Triethyleneglycol dimethacrylate | 1.42 |
| 25% dispersion of carbon black in isopropanol | 6.2 |
| 3,3'-diethylthiacyanine p-toluenesulfonate | 0.05 |
| Michler's ketone | 0.05 |
| 2,3-boronanedione | 0.08 |
| Trichloroethylene | 39.4 |

The solution was coated at a wet thickness of 0.002 inch with a doctor knife on a 0.004-inch-thick polyethylene terephthalate photographic film base subbed with the resin sub of Alles, U.S. Pat. No. 2,779,684, Example IV support and allowed to dry.

The clear layer and black layer were placed together and laminated by passing through heated rolls at 100° C. and suitable pressure. The element so prepared was exposed from the clear side through a $\sqrt{2}$ step tablet with a 1000 w. quartz-iodine lamp at a distance of 5 ft. for 30 sec. The exposed sample was delaminated at 100° C. to give a positive black image on the 0.004-inch-thick support and a negative black image on the 0.0075-inch-thick support.

EXAMPLE LIX

A coating solution was prepared according to the following formula:

| | G. |
|---|---|
| Cellulose acetate (acetyl 40%, ASTM visc. 25) | 0.16 |
| Cellulose acetate butyrate (butyrate 17%, ASTM visc. 15) | 0.25 |
| Trimethylolpropane triacrylate | 0.80 |
| Acetone | 6.9 |
| Michler's ketone | 0.0128 |
| 2,3-bornanedione | 0.0080 |

The solution was coated with a doctor knife on a 0.001-inch-thick unsubbed polyethylene terephthalate web to a wet thickness of 0.002 inch. The coated element was dried and laminated at room temperature with a 0.001-inch-thick unsubbed polyethylene terephthalate cover sheet.

A sample of the element so prepared was exposed through a $\sqrt{2}$ step wedge with a rotary diazo printer (Blue Ray®, average intensity 3.2 mf./cm.²) for 20 seconds. The cover sheet was removed and the coating was dusted with Quindo Magenta, C.I. Pigment Red 122. The steps up to step 16 inclusive had polymerized and did not accept pigment.

A control element made as above but without the 2,3-bornanedione polymerized only to step 6 inclusive when exposed as above.

EXAMPLE LX

The following solution was prepared.

| | G. |
|---|---|
| Methyl methacrylate/methacrylic acid copolymer (90/10 mole ratio) | 2 |
| Diethylene glycol diacrylate | 5 |
| 4,4'-bis(diethylamino)benzophenone | 0.05 |
| 2,3-bornanedione | 0.10 |
| Ethyleneglycol monoethyl ether | 8 |

This solution was dispersed in a solution of 10 g. of gelatin in 40 g. of water by mixing in a high speed blender for 2 minutes. The dispersion was coated with a doctor knife on a 0.004-inch-thick polyethylene terephthalate web support to a wet thickness of 0.003 inch and dried. A sample of the element so prepared was exposed through a process transparency using a 3750 watt pulsed xenon arc at a distance of 18 inches for five seconds. The exposed element was immersed in a 2% aqueous solution of Rhodamine B Extra dye for 2 minutes, washed with cold water for 15 minutes, and dried. A positive, magenta colored image was obtained.

The above element may also be used for preparing gravure printing plates. A method for forming a gravure printing plate, for example, comprises, in either order, (a) exposing to actinic radiation such a layer coated on a support, e.g., transparent film support, first through a gravure screen and then to a continuous tone image transparency which gives an image in the resist modulated by photopolymerization, and (b) adhering the surface of said layer to the surface to be imaged which has been moistened with water and peeling off the transparent film support, then (c) etching the surface to produce an intaglio printing surface with conventional etching solution, e.g., ferric chloride, (d) washing the etched surface, e.g., with hot water to remove the residual etching solution and the photopolymer resist. The process may also be carried out by exposing the layer to the gravure screen through the transparent support and to the continuous tone image from the opposite side. In addition, the dispersion may be coated directly on the surface to be etched.

I claim:

1. A photopolymerizable composition comprising (a) at least one non-gaseous ethylenically unsaturated compound having a boiling point above 100° C. at normal atomspheric pressure and being capable of forming a high polymer by photoinitiated, addition polymerization;

(b) a cyclic cis-α-dicarbonyl compound, the excited state of which cannot react intramolecularly, *the atoms adjacent to the two vicinyl carbonyl groups being saturated when they are carbon atoms*; and (c) an actinic radiation absorbing compound capable of sensitizing the polymerization initiating action of said cyclic cis-α-dicarbonyl compound, said actinic radiation absorbing compound being a nitrogen-containing aromatic or heterocyclic compound, having maximum absorption below 520 nm., selected from the class consisting of bis(p-aminophenyl-α,β-unsaturated) ketones; bis(alkylamino) acridine dyes; cyanine dyes containing two heterocyclic rings joined by a single methine group; styryl dye bases; 7-diloweralkylamino-4 lower alkyl coumarins; p-aminophenyl ketones; p-dialkylaminophenyl unsaturated compounds; and 6-dialkylaminoquinaldines.

2. A composition according to claim 1 wherein said cyclic cis-α-dicarbonyl compound is selected from the group consisting of 2,3-bornanedione; 2,2,5,5-tetramethyltetrahydro-3,4-furandione; imidazoletrione; indole-2,3-dione; 1,1,4,4-tetramethyl-tetralin-2,3-dione; 3-methyl-1,2-cyclopentanedione; 2,3-dioxo-5,6-diethoxy-5,6-dicyanopyrazine; and 1,4,5,6-tetrahydro-5,6-dioxo-2,3-pyrazine dicarboximide.

3. A composition according to claim 1 additionally containing a macromolecular organic polymer binder, said ethylenically unsaturated compound and said binder being present in relative amounts of from 3–95 and 5–97 parts by weight, respectively.

4. A composition according to claim 1 wherein said cyclic cis-α-dicarbonyl compound and said actinic radiation absorbing compound are each present in amounts of 0.001 to 10 parts by weight per 100 parts of the combined weight of said ethylenically unsaturated compound and any binder.

5. A composition according to claim 4 additionally containing up to 10 parts by weight of a free-radical producing hydrogen or electron donor compound per 100 parts of the combined weight of said ethylenically unsaturated compound and any binder.

6. A composition according to claim 1 wherein said cis-α-dicarbonyl compound is 2,3-bornanedione.

7. A composition according to claim 6 wherein said actinic radiation absorbing compound is selected from the group consisting of Michler's ketone; 4,4′-bis(diethylamino)benzophenone; 3,3′-diethylthiacyanine p-toluenesulfonate; 2-(p-dimethylaminostyryl)benzothiazole; [3-ethyl-naphthoxazole] [3′-ethyl-naphthiazole] monomethinecyanine p-toluenesulfonate; Diethyl Orange; 7-diethylamino-4-methyl-coumarin; and 2,5-bis(p-diethylaminobenzilidene) cyclopentanone.

8. A composition according to claim 1 additionally containing a thermal addition polymerization inhibitor.

9. A composition according to claim 1 dispersed in a hydrophilic colloid.

10. A photographic element comprising a support coated with a composition of claim 1.

11. A photographic element according to claim 10 wherein said support is a polymeric film or metallic surface.

12. A photographic element according to claim 11 wherein the photpolymerizable composition is dispersed in a hydrophilic colloid.

* * * * *